United States Patent
Kim et al.

(10) Patent No.: US 7,850,357 B2
(45) Date of Patent: Dec. 14, 2010

(54) OPTICAL GUIDE BAR, LINE LIGHT SOURCE DEVICE, SURFACE LIGHT ILLUMINATION DEVICE, AND DISPLAY APPARATUS

(75) Inventors: Young-chan Kim, Suwon-si (KR); Moon-gyu Lee, Suwon-si (KR); Oleg Prudnikov, Yongin-si (KR); Kyu-min Choe, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 11/949,842

(22) Filed: Dec. 4, 2007

(65) Prior Publication Data
US 2009/0021948 A1    Jan. 22, 2009

(30) Foreign Application Priority Data
Jul. 19, 2007    (KR) .................... 10-2007-0072487

(51) Int. Cl.
*F21V 7/04*    (2006.01)

(52) U.S. Cl. .................. 362/610; 362/555; 362/612; 349/65

(58) Field of Classification Search ............... 362/555, 362/561, 608, 610, 612; 349/62–65
See application file for complete search history.

(56) References Cited

U.S. PATENT DOCUMENTS

2006/0139950 A1 * 6/2006 Maeda et al. ............... 362/610

\* cited by examiner

*Primary Examiner*—Jason Moon Han
(74) *Attorney, Agent, or Firm*—Sughrue Mion, PLLC (57) ABSTRACT

Provided is an optical guide bar including: a light exit portion; light incident portions, on which light is incident, formed on both sides of the light exit portion; and a reflective portion facing the light exit portion and including a prism pattern that reflects light transmitted through the light incident portions towards the light exit portion. A shape of the reflective portion is determined in consideration of an effective light emission width of the light incident portion so that the intensity of light at any portion of the reflective portion is uniform.

21 Claims, 11 Drawing Sheets

OPTICAL GUIDE BAR, LINE LIGHT SOURCE DEVICE, SURFACE LIGHT ILLUMINATION DEVICE, AND DISPLAY APPARATUS

CROSS-REFERENCE TO RELATED PATENT APPLICATIONS

This application claims the benefit of Korean Patent Application No. 10-2007-0072487, filed on Jul. 19, 2007, in the Korean Intellectual Property Office, the disclosure of which is incorporated herein in its entirety by reference.

BACKGROUND OF THE INVENTION

1. Field of the Invention

The present invention relates to an optical guide bar, a line light source device, a surface light illumination device, and a display apparatus adopting the same.

2. Description of the Related Art

Various types of light sources are being developed in accordance with the development of display apparatuses. A non-emissive type flat panel display apparatus such as a liquid crystal display (LCD) requires an illumination device to provide a surface light. The light source of the illumination device for providing the surface light can use a line light source such as a color cathode fluorescent lamp (CCFL) or a point light source such as a light emitting diode (LED) and an organic light emitting diode (OLED). The line light source shows an even light distribution in a length direction thereof. However, there is a limitation in the shortest length of the line light source, and thus, it is difficult to apply the line light source to small sized portable display apparatuses. Therefore, recently LEDs and OLED are commonly used as the light source in the small size portable display apparatus since they show high brightness while having a small size. In a case where a plurality of point light sources are used as the light source, a problem of uneven brightness over the entire surface of a display apparatus caused by bright lines and dark lines generated between the point light sources must be solved. Therefore, a line light source device for changing the light irradiated from the light source into the line light source is required. In addition, a surface light illumination device that changes the light irradiated from the line light source device into the surface light is also required.

SUMMARY OF THE INVENTION

The present invention provides an optical guide bar having a uniform optical emission angle distribution, a line light source device adopting the optical guide bar, a surface light illumination device adopting the line light source device, and a display apparatus adopting the above elements.

The present invention also provides an optical guide bar having a uniform brightness distribution, a line light source apparatus adopting the optical guide bar, a surface light illumination device adopting the line light source device, and a display apparatus adopting the above elements.

According to an aspect of the present invention, there is provided an optical guide bar including: a light exit portion; light incident portions, on which light is incident, formed on both sides of the light exit portion; and a reflective portion facing the light exit portion and including a prism pattern that reflects light transmitted through the light incident portions towards the light exit portion, wherein a shape of the reflective portion is determined in consideration of an effective light emission width of the light incident portion so that intensity of the light at any portion of the reflective portion is constant.

According to another aspect of the present invention, there is provided a line light source device including: the optical guide bar; and a light source irradiating light to light incident portions of the optical guide bar.

According to another aspect of the present invention, there is provided a surface light illumination device including: the optical guide bar; a light source irradiating light to light incident portions of the optical guide bar; and a light guide plate including a side surface, on which light emitted from the optical guide bar is incident, a front surface and a rear surface facing each other and connected to the side surface, and a light exit unit disposed on one of the front surface and the rear surface such that light that is transmitted by the side surface is emitted from the one of the front surface and the rear surface.

According to another aspect of the present invention, there is provided a display apparatus including: the optical guide bar; a light source irradiating light to light incident portions of the optical guide bar; a light guide plate including a side surface, on which light emitted from the optical guide bar is incident, a front surface and a rear surface facing each other and connected to the side surface, and a light exit unit disposed on one of the front surface and the rear surface such that light that is transmitted by the side surface is emitted from the one of the front surface and the rear surface; and an image display panel located to face the one of the front surface and the rear surface that emits light to form images using the light emitted from the light guide plate.

A distance between the light exit portion and the reflective portion may be large at a center portion of the reflective portion and becomes smaller towards the light incident portions.

When it is assumed that a direction of an optical axis of the exit light is a y direction, a direction perpendicular to the optical axis is an x direction, a distance from the center portion of the reflective portion to a light incident portion in the x direction is L, and a distance from the center portion of the reflective portion to an end portion of the light exit portion in the y direction is $h_0$, the shape of the reflective portion may be represented as $$y = f(x) = (x^2 - L^2)\left[-\left(\frac{h_0}{L^2}\right) + \sum_{n=1}(a_n x^{2n})\right],$$

where n denotes an integer and $a_n$ is a coefficient of a polynomial expression.

When an apex angle of the prism pattern is divided into a first angle and a second angle by a line that is in parallel with the optical axis, the first and second angles may be determined so that the light irradiated from centers of the effective light emission widths of the light incident portions can be reflected to be parallel with the optical axis.

The prism pattern may have the apex angle that is asymmetric based on a line that is in parallel with the optical axis.

The light source may be a point light source.

The image display panel may be a semi-transmissive image display panel that reflects some of the light toward the light guide plate.

According to another aspect of the present invention, there is provided an optical guide bar including: a light exit portion; light incident portions, on which light is incident, formed on both sides of the light exit portion; and a reflective portion facing the light exit portion and including a prism pattern that reflects light transmitted through the light incident portions towards the light exit portion, wherein the prism pattern has an apex angle that is asymmetric based on a line that is in parallel with an optical axis of the exit light.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, an optical guide bar, a line light source device, a surface light illumination device, and a display apparatus will be described with reference to accompanying drawings.

Figure 1:
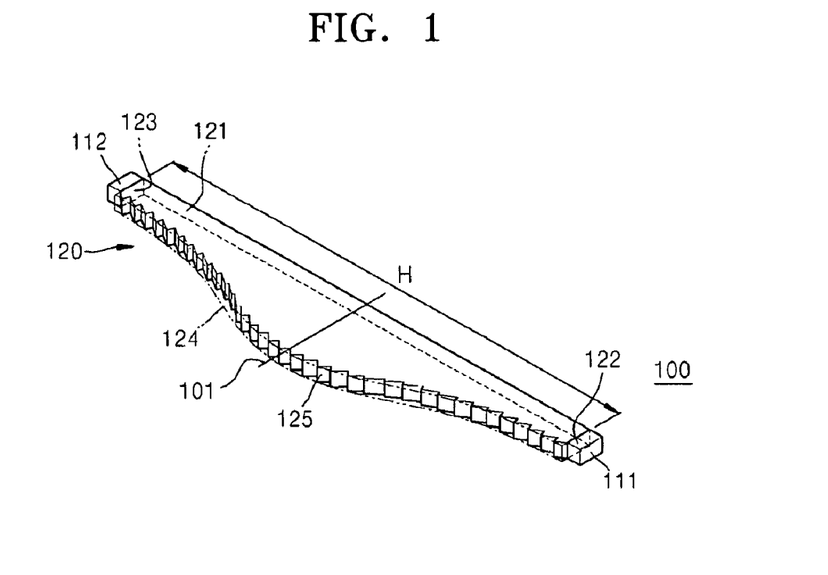
FIG. 1 is a perspective view of an optical guide bar and a line light source device according to an embodiment of the present invention.
Figure 2:
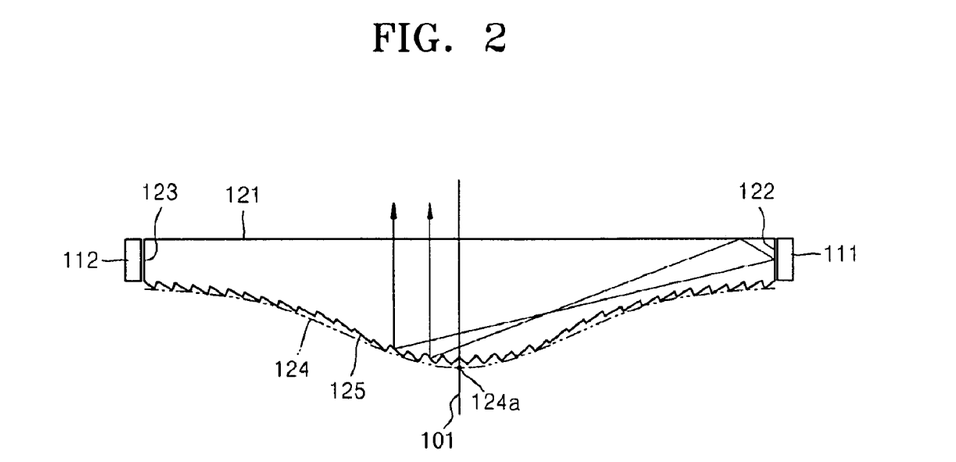
FIG. 2 is a plan view of the optical guide bar and the line light source device shown in FIG. 1.

FIG. 1 is a perspective view of an optical guide bar and a line light source device including the optical guide bar according to an embodiment of the present invention, and FIG. 2 is a plan view of the optical guide bar and the line light source device of FIG. 1. Referring to FIGS. 1 and 2, the line light source device 100 includes light sources 111 and 112, and an optical guide bar 120 redirecting light irradiated from the light sources 111 and 112 into linear rays and emitting the linear rays. The light sources 111 and 112 may be point light sources such as an LED, an OLED, or a laser diode (LD). The optical guide bar 120 is formed of a light-transmissive material, for example, PMMA (Poly Methyl Meth Acrylate) or PC (Poly carbonate). The optical guide bar 120 includes a light exit portion 121 outputting the light, light incident portions 122 and 123 disposed on both sides of the light exit portion 121, and a reflective portion 124 facing the light exit portion 121. The light exit portion 121 is plane-shaped. A length (H) of the light exit portion 121 may be equal to a length of an illuminated body or longer. For example, when the line light source device 100 is adopted as the light source in the surface light illumination device including a light guide plate that will be described later, the length H of the light exit portion 121 may be equal to a length of a light incident surface (side surface) of the light guide plate or longer. The light sources 111 and 112 illuminate the light through the light incident portions 122 and 123. The reflective portion 124 includes a prism pattern 125 reflecting the light incident from the light incident portions 122 and 123 toward the light exit portion 121.

In order for the line light source device 100 to perform as the line light source such as a cold cathode fluorescent lamp (CCFL), the intensity of the light output throughout the entire length H of the light exit portion 121 must be constant. To do this, the intensity of light reaching a certain portion of the reflective portion 124 may be equivalent throughout the entire reflective portion 24. Therefore, the entire shape of the reflective portion 124 is determined so that the intensities of the light incident through the light incident portions 122 and 123 and reaching certain portions of the reflective portion 124 are equal to each other.

Figure 3:
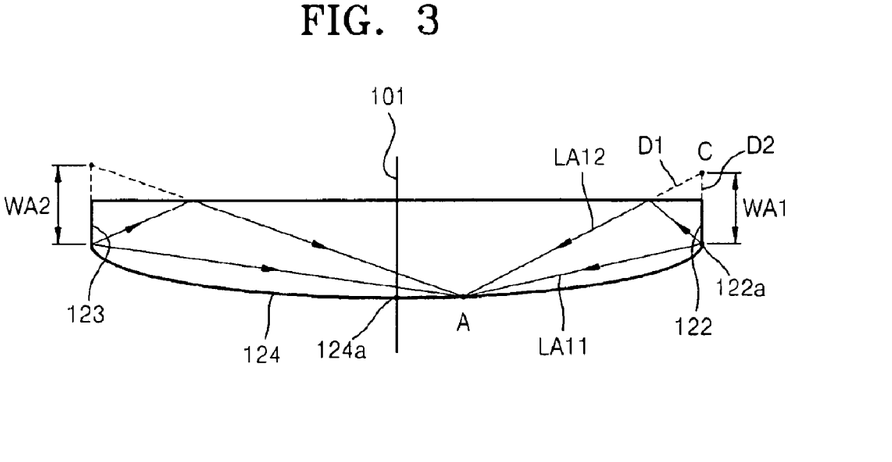
FIG. 3 is a diagram showing a light path to a certain portion of a reflective portion.

Referring to FIG. 3, a process of determining the shape of the reflective portion 124 so as to make the light intensities even will be described. In FIG. 3, the shape of the reflective portion 124 is different from those of FIGS. 1 and 2. However, the present invention is not limited to the shape of the reflective portion 124 shown in FIG. 3. A total intensity F of light reaching a portion A of the reflective portion 124 is a sum of intensities F1 and F2 of light reaching the portion A among the light respectively irradiated from the light sources 111 and 112 and incident into the optical guide bar 120 through the light incident portions 122 and 123. The light that can reach the portion A among the light incident into the light incident portion 122 is the light between the ray of light LA11 directly reaching the portion A from an end portion 122a of the light incident portion 122 and the ray of light LA12 reaching the portion A by being totally reflected on the light exit portion 121 after being irradiated from the end portion 122a of the light incident portion 122. That is, when it is assumed that an intersection point between an extended line D1 of the ray of light LA12 and an extended line D2 of the light incident portion 122 is a point C, an effective light emission width WA1 of the light incident portion 122 with respect to the portion A is a portion between the end portion 122a of the light incident portion 122 and the intersection point C. The effective light emission width WA1 is in proportion to the intensity F1 of the light reaching the portion A among the light incident into the optical guide bar 120 through the light incident portion 122. Likewise, an effective light emission width WA2 of the light incident portion 123 with respect to the portion A can be determined. The effective light emission width WA2 is in proportion to the intensity F2 of the light reaching the portion A among the light incident into the optical guide bar 120 through the light incident portion 123.

As described above, the total light intensity F on the certain portion of the reflective portion 124 is calculated in consideration of the effective light emission portions of the light incident portions 122 and 123 with respect to the certain portion A of the reflective portion 124, and the shape of the reflective portion 124 can be determined so that the total light intensity F can be constant throughout the entire length of the reflective portion 124.

Figure 4:
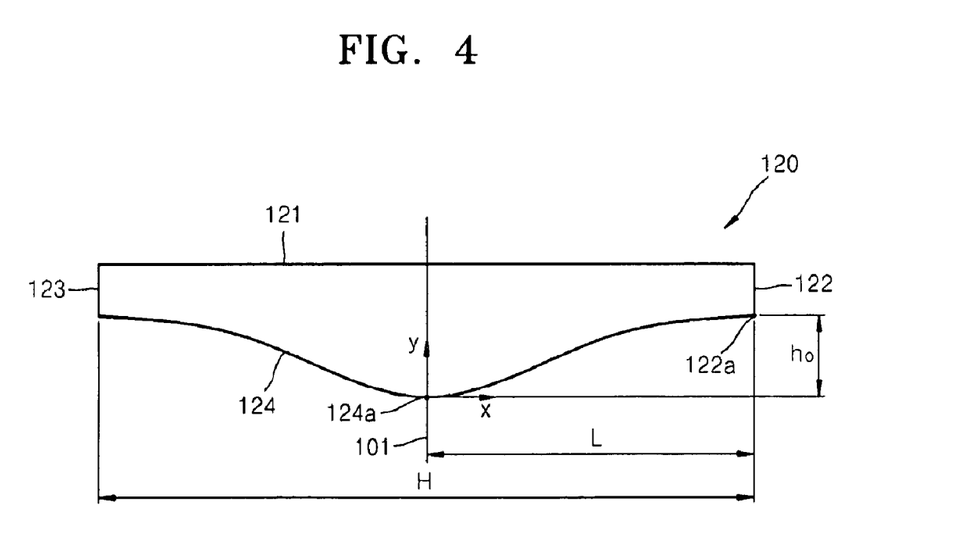
FIG. 4 is a diagram showing variables for determining a shape of the reflective portion.

In the optical guide bar 120 determined through the above process, a width between the optical exit portion 121 and the reflective portion 124 is thick at a center portion 124a and is thinner toward the light incident portions 122 and 123. Here, a width direction means a direction of an optical axis 101 of the exit light. For example, in FIG. 4, when it is assumed that the optical axis 101 of the exit light is y, a direction perpendicular to the optical axis 101 is x, a distance from the center portion 124a of the reflective portion 124 to the light incident portion 122 in the x direction is L, and a distance from the center portion 124a of the reflective portion 124 to the end portion 122a of the light incident portion 122 in the y direction is $h_0$, the shape of the reflective portion 124 can be represented by following equation, $$y = f(x) = (x^2 - L^2)\left[-\left(\frac{h_0}{L^2}\right) + \sum_{n=1} (a_n x^{2n})\right],$$

where n denotes a positive integer, and $a_n$ is a coefficient of a polynomial expression.

Figure 5:
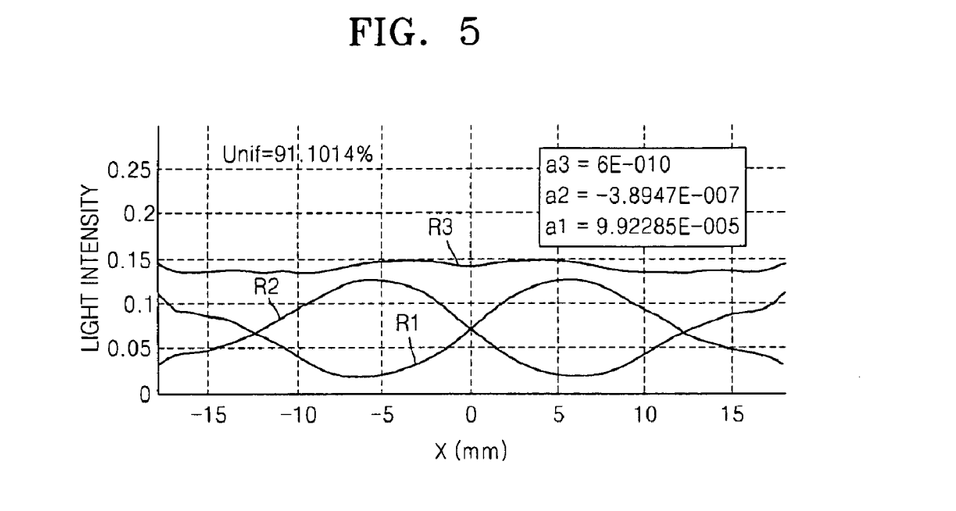
FIG. 5 is a graph showing a simulation result of a light intensity distribution in the determined reflective portion.

FIG. 5 is a graph showing a result of simulating the light intensity distribution of the reflective portion 124. The simulation was performed under conditions of $h_0$=5.4 mm, L=H/2=18.92 mm, widths of the light incident portions 122 and 123=2.7 mm, and the first to the third order terms in $$\sum_{n=1} (a_n x^{2n})$$

were considered. In FIG. 5, the numbers on the vertical axis denote the relative values of the light intensities in the simulation. A curve R1 denotes the intensity F1 of light irradiated from the light source 111 that is transmitted into the optical guide bar 120 through the light incident portion 122 and reaches the reflective portion 124. A curve R2 denotes the intensity F2 of light irradiated from the light source 112 that is transmitted into the optical guide bar 120 through the light incident portion 123 and reaches the reflective portion 124. A curve R3 denotes the total light intensity F. In this embodiment, a uniformity of the total light intensity F is about 91.1%, and this is when the equation $$\sum_{n=1} (a_n x^{2n})$$

is only considered to the third order term. It can be expected that the uniformity of the total light intensity F in the reflective portion 124 is close to 100% as n is increased.

Figure 6:
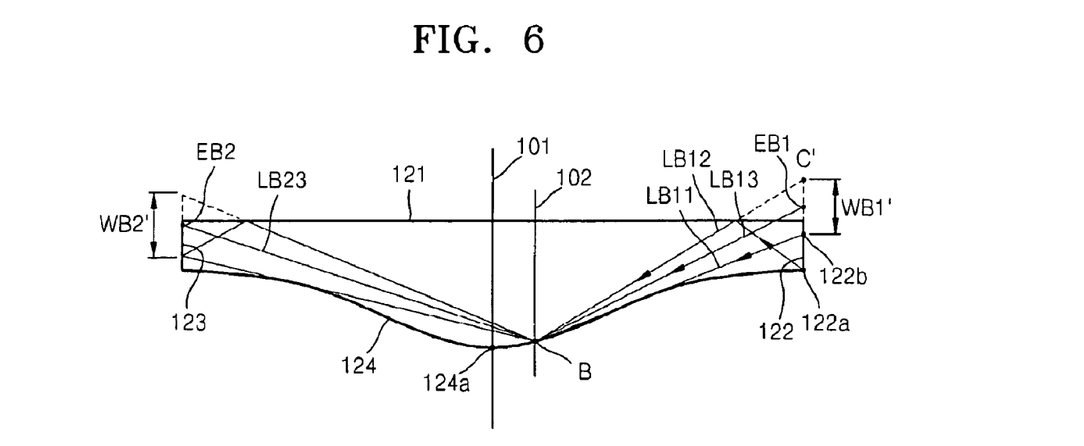
FIGS. 6 and 7 are diagrams showing a process of determining an asymmetric apex angle of a prism pattern.
Figure 7:
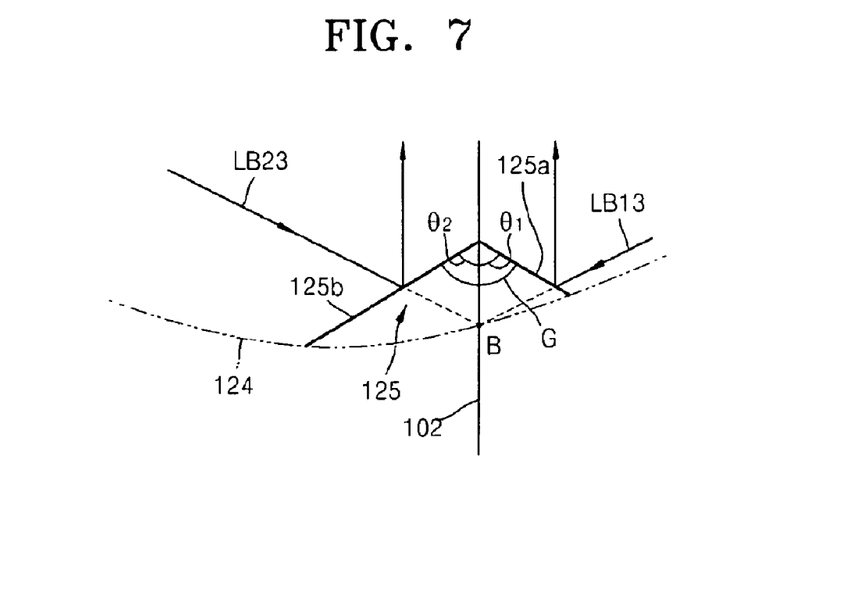

As described above, when the shape of the reflective portion 124 is determined, the line light source device 100 is ready for performing as the line light source such as the CCFL. Paths of the light emitted from the light incident portions 122 and 123 are different according to the position of the reflective portion 124. The prism pattern 125 is determined so that the light can exit in parallel with the optical axis 101 in consideration of the difference between the light paths according to the positions of the reflective portion 124. To do this, the line light source device 100 includes the prism pattern 125, an apex angle (G) of which is asymmetric based on a line 102 that is in parallel with the optical axis 101. Although it is not shown in the drawings, the prism pattern 125 can include a reflective coating layer in order to improve a light reflection efficiency. Accordingly, an optical angle distribution of the light output through the light exit portion 121 can be reduced. Referring to FIGS. 6 and 7, a process of determining the apex angle G of the prism pattern 125 will be described as follows.

Figure 8:
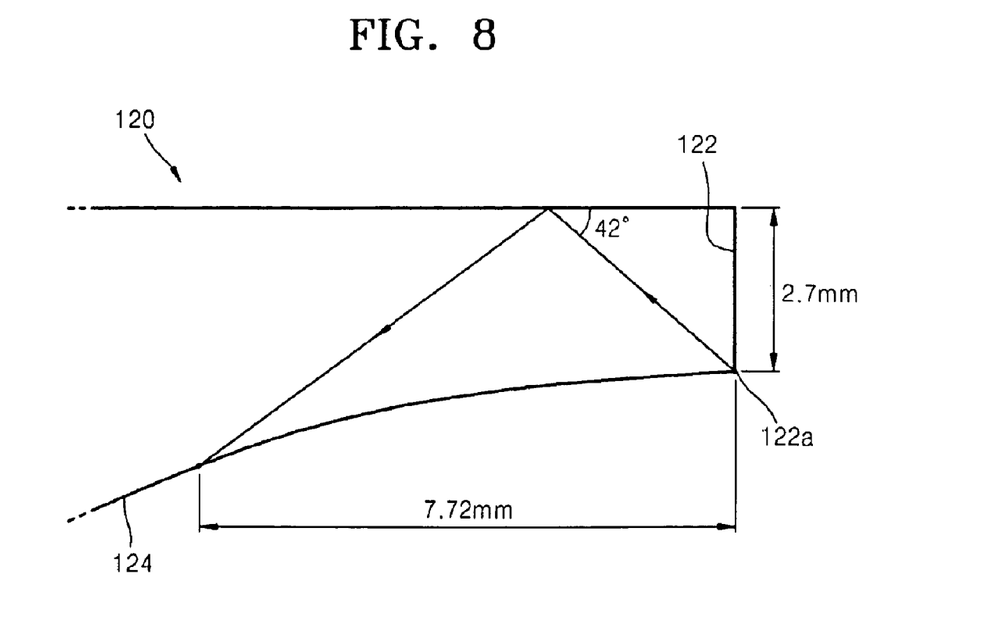
FIG. 8 is a diagram showing a part of a light incident portion excluded from an efficient light emission width.

In FIGS. 6 and 7, the light paths reaching a certain portion B of the reflective portion are shown. The light emitted from a part of the light incident portion 122 cannot be directly incident into the portion B because of the shape of the reflective portion 124. That is, the light emitted between an intersection point 122b, on which a line LB11 that is tangential to the curve of the reflective portion 124 from the portion B meets the light incident portion 122, and the end portion 122a of the light incident portion 122 cannot be directly incident into the portion B, but is totally reflected by the light exit portion 121 to be incident into the portion B. Therefore, when it is assumed that C' is an intersection point where an extended line of the ray of light LB12 that is emitted from the end portion 122a of the light incident portion 122 and incident on the portion B meets an extended line of the light incident portion 122, an effective light emission width WB1' with respect to the portion B is between the intersection point 122b and the intersection point C'. As shown in FIG. 8, when it is assumed that the optical guide bar 120 that is determined by the simulation conditions shown in FIG. 5 is formed of the PMMA having a refractive index of 1.49, the light emitted from the end portion 122a of the light incident portion 122 cannot be incident on a region within 7.72 mm from the light incident portion 122 by the total reflection. This is because the distribution of the light that can be transmitted into the optical guide bar 120 through the light incident portions 122 and 123 is restricted within ±42° due to a difference between the refractive indexes of the optical guide bar 120 and an external medium (for example, air). Therefore, the end portion 122a of the light incident portion 122 is not included in the effective light emission width. Likewise, an effective light emission width WB2' of the light emitted from the light incident portion 123 with respect to the portion B can be determined. In order to determine the apex angle G of the prism pattern 125, the rays of light LB13 and LB23 that are emitted from centers EB1 and EB2 of the effective light emission widths WB1' and WB2' and are incident into the portion B reference rays of light, and the apex angle G of the prism pattern 125 is determined so that the reference rays of light LB13 and LB23 can be reflected by the reflective portion 124 to be parallel with the optical axis 101. Referring to FIG. 7, the apex angle G of the prism pattern 125 is divided into a first angle θ1 and a second angle θ2 by the line 102 that passes through the portion B in parallel with the optical axis 101. The first angle θ1 is determined so that the light LB 13 can be reflected by an inclined surface 125a to be parallel with the line 102. The second angle θ2 is determined so that the light LB23 can be reflected by an inclined surface 125b to be parallel with the line 102. The above process is repeated with an interval of tens~hundreds of microns to determine the apex angle G of the prism pattern 125.

The apex angle G of the prism pattern 125 determined by the above process is asymmetric based on the line 102 that is in parallel with the optical axis 101. That is, the first angle θ1 and the second angle θ2 are different from each other. On the center portion 124a of the reflective portion 124, since the reference light incident into the center portion 124a from the light incident portions 122 and 123 is symmetric based on the optical axis 101 of the exit light, the apex angle G of the prism pattern 125 is symmetric with the optical axis 101. Therefore, the apex angle G that is asymmetric based on the line that is in parallel with the optical axis 101 in the present invention includes a case where the apex angle G of the prism pattern 125 is symmetric based on the optical axis 101 on the center portion 124a of the reflective portion 124.

Figure 9:
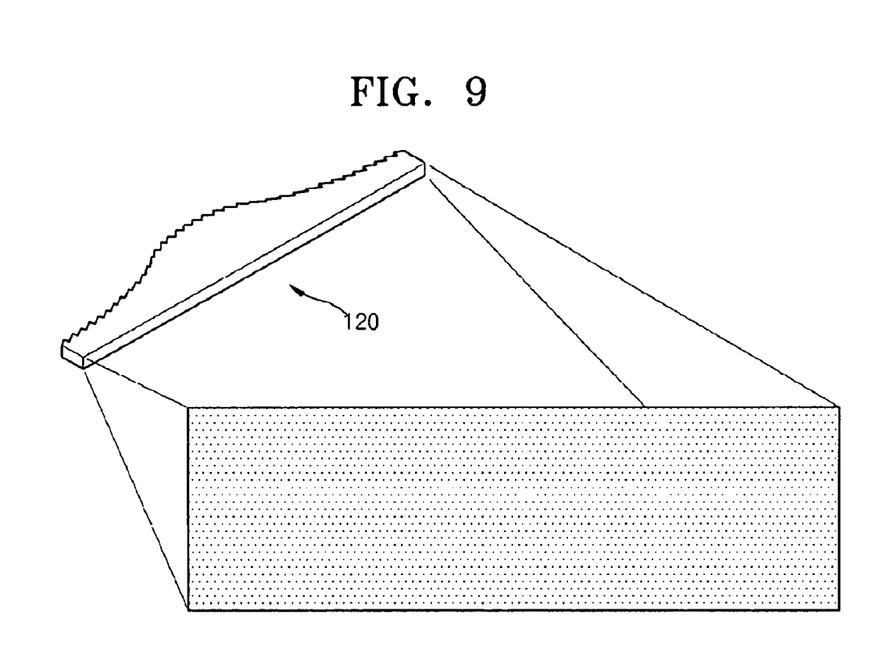
FIG. 9 is a diagram showing a result of simulating exit light distribution of a light exit portion in a case where a reference light is determined in consideration of the effective light emission width according to a position of the reflective portion and an apex angle of the prism pattern is determined based on the reference light.

FIG. 9 shows a result of simulating an exit light distribution from the light exit portion 121 in a case where the reference light is determined in consideration of the effective light emission width according to the position of the reflective portion 124 and the apex angle G of the prism pattern 125 is determined based on the reference light. As shown in FIG. 9, the exit light can be distributed evenly throughout the entire surface of the light exit portion 121. That is, collimated light having constant brightness can be emitted throughout the entire light exit portion 121. Therefore, the entire area of the light exit portion 121 can be used as an effective illumination area. That is, the length of the light exit portion 121 can be nearly the same as a length of a side surface 211 of light guide plates 210 and 210a that will be described later.

Figure 10A:
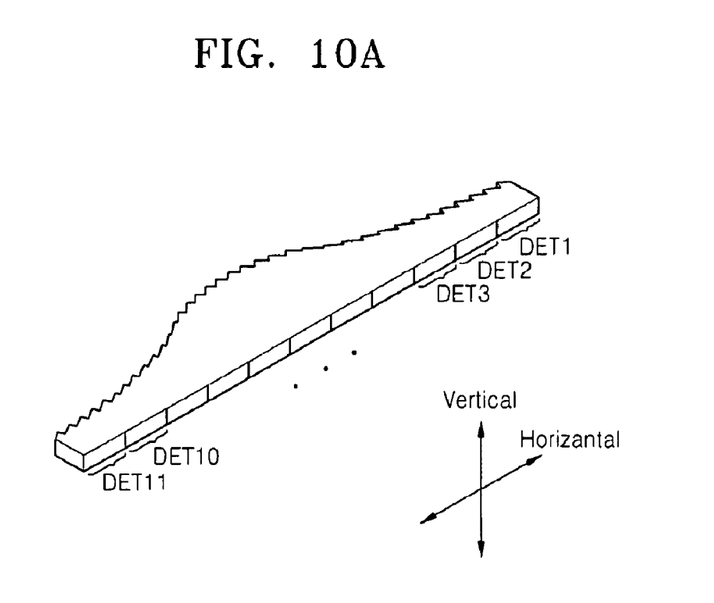
FIGS. 10A and 10B are diagrams showing results of simulating exit light distributions in each of regions DET1~DET11 that are obtained by dividing the light exit portion into eleven regions.
Figure 10B:
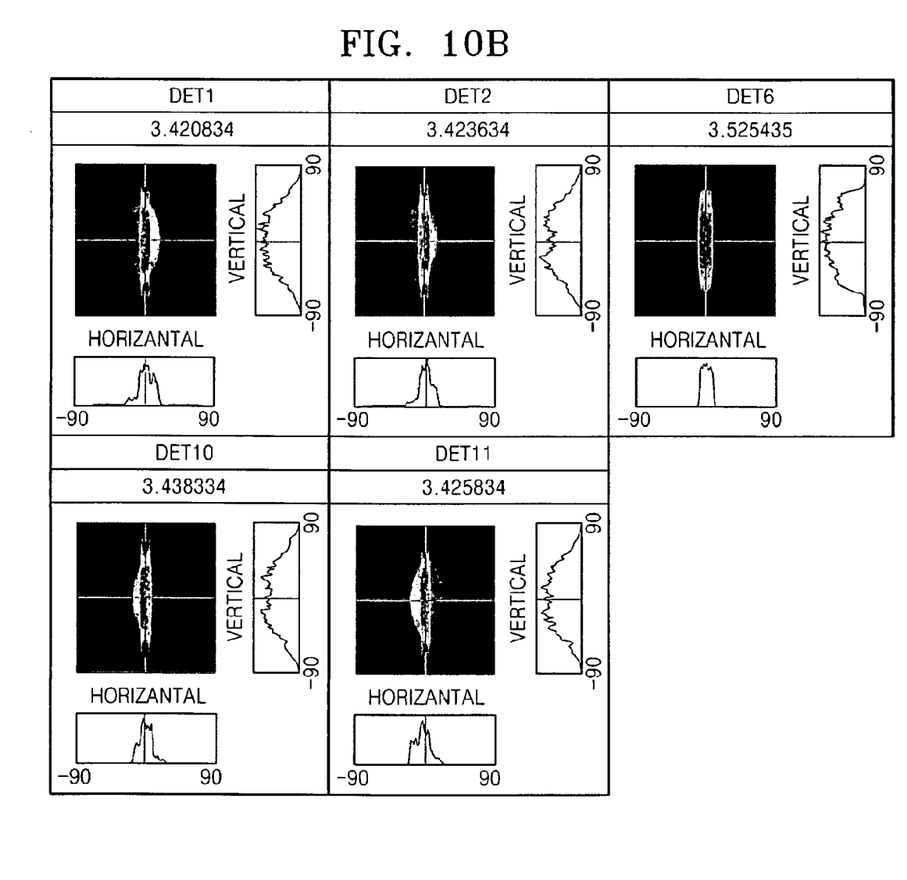

FIGS. 10A and 10B show results of simulating optical angle distribution of the light emitted from the light exit portion 121. As shown in FIG. 10A, the light exit portion 121 of the optical guide bar 120 is divided into eleven regions (DET1~DET11), and the optical angle distribution in each of the regions is simulated. FIG. 10B shows simulation results of the regions DET1, DET2, DET6, DET10, and DET1. Referring to FIG. 10B, light having a very narrow optical angle in the horizontal direction is emitted from every region of the light exit portion 121. This means that the light that is collimated in the horizontal direction is output from every region of the light exit portion 121. In addition, there is a small difference between the light intensities of the most extreme side regions DET1 and DET11 and the center region DET6 of the light exit portion 121, and thus, a constant light intensity distribution can be obtained. According to the simulation result, the uniformity of the light intensity of the entire light exit portion 121 is about 94.19%, and an optical efficiency of the exit light is about 66.23%. In addition, a full width at half-maximum (FWHM) of the exit light is ±8.2° in the horizontal direction and ±56° in the vertical direction, which shows a high collimating efficiency. In FIG. 10B, numbers are relative values representing the light intensities.

Figure 11:
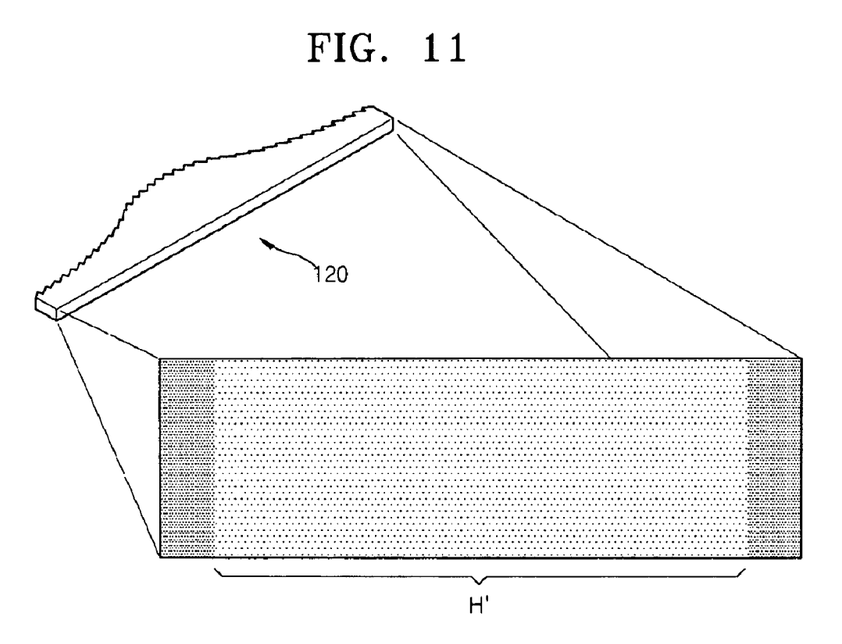
FIG. 11 is a diagram showing a result of simulating the exit light distribution of the light exit portion in a case where a change of the effective light emission width is not considered in determining the apex angle of the prism pattern.

FIG. 11 shows a result of simulating the exit light distribution of the light exit portion 121 in a case where the change of the effective light emission width is not considered when determining the apex angle G of the prism pattern 125. As shown in FIG. 11, dark parts are generated around the light incident portions 122 and 123. This is caused when the reference point for determining the apex angle G of the prism pattern 125 is fixed on a certain point of the light incident portions 122 and 123 without considering the change of the effective light emission width. In this case, the prism pattern 125 close to the light incident portions 122 and 123 cannot emit the light to be in parallel with the optical axis 101, and thus, the light emitted to the light exit portion 121 that is close to the light incident portions 122 and 123 has a wide optical angle and a low light intensity. The region that can be used as the illumination light is the portion except for the side dark portions, that is, H'. Therefore, since a length of the portion H' must be nearly the same as the length of the side surface 211 of the light guide plates 210 and 210a that will be described later, the entire length of the light exit portion 121 must be longer than that of the side surface 211 of the light guide plates 210 and 210a. In addition, the uniformity of the light intensity in the portion H' is also degraded. However, in comparison with a case where the reflective portion 124 is formed as a flat plane and in a case where the apex angle G of the prism pattern 125 is symmetric based on the line that is in parallel with the optical axis 101, light distribution having a relatively high uniformity can be obtained.

The optical guide bar 120 of the present invention has a first feature of forming the apex angle G of the prism pattern 125 to be asymmetric based on the line that is in parallel with the optical axis 101 in consideration of the effective light emission width at a certain portion of the reflective portion 124, and a second feature of determining the shape of the reflective portion 124 so that the light intensity can be constant at any portion of the reflective portion 124 in consideration of the effective light emission width at any portion of the reflective portion 124. Therefore, the optical guide bar 120 is not limited to the optical guide bar having both of the reflective portion 124 having the constant light intensity at any portion thereof and the prism pattern 125 having the asymmetric apex angle G. For example, if the shape of the reflective portion 124 can be formed in any shape and the apex angle G of the prism pattern 125 is asymmetric based on the line that is in parallel with the optical axis 101, a uniform light distribution can be obtained. In addition, the prism pattern 125 can be any type of prism pattern as long as the reflective portion 124 has a constant light intensity at any portion thereof, and thus, the brightness distribution of the light emitted from the light exit portion 121 can be uniform.

Figure 12:
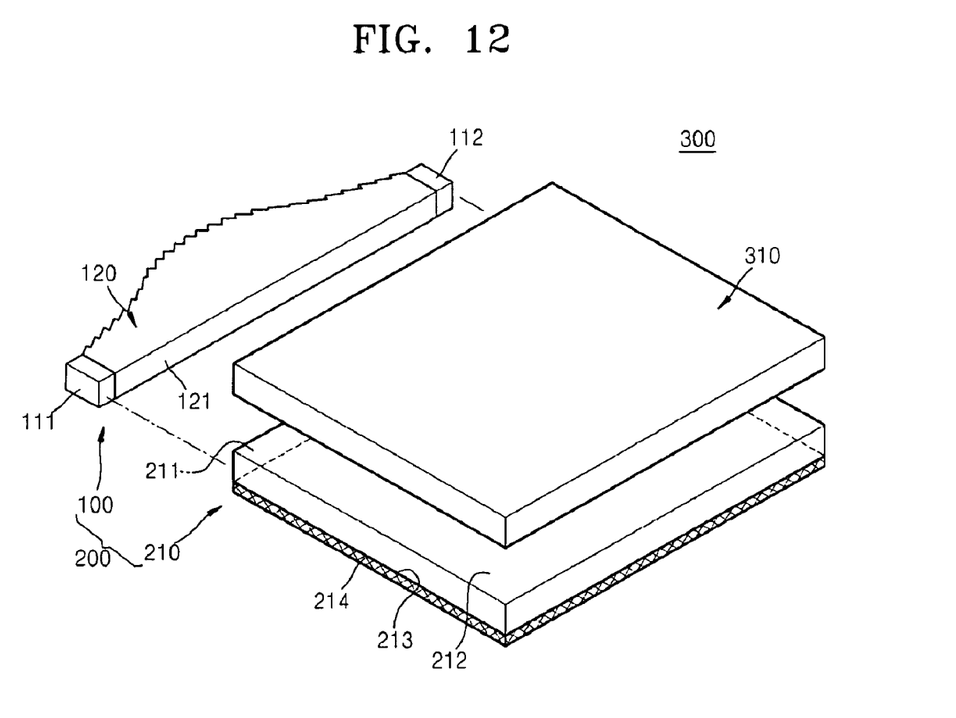
FIG. 12 is a perspective view of a surface light illumination device including the line light source device and a display apparatus according to an embodiment of the present invention.
Figure 13:
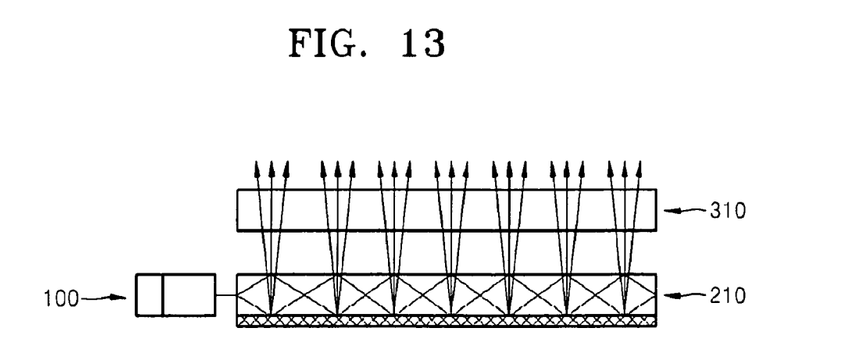
FIG. 13 is a side view of the surface light illumination device and the display apparatus of FIG. 12.

FIG. 12 is a perspective view of a surface light illumination device 200 including the line light source device 100 and a display apparatus 300 according to an embodiment of the present invention, and FIG. 13 is a side view of the surface light illumination device 200 and the display apparatus 300. Referring to FIGS. 12 and 13, the surface light illumination device 200 includes the line light source device 100 and a light guide plate 210.

The light guide plate 210 is a flat plate member formed of a light transmissive material such as PMMA or PC. The light guide plate 210 includes a side surface 211, on which the light emitted from the line light source device 100 is incident, and a front surface 212 and a rear surface 213 connected to the side surface 211. The front surface 212 and the rear surface 213 face each other. The light exit portion 121 of the line light source device 100 faces the side surface 211. A light exit unit 214 is disposed on the rear surface 213 in order for light transmitted through the side surface 211 to be emitted out of the front surface 212. The light exit unit 214 can adopt a well-known pattern such as a scattering pattern or a diffraction pattern. The scattering pattern and the diffraction pattern can be formed by mechanically processing the surface of the light guide plate 210 or compressing a stamp, on which the pattern is formed, onto the rear surface 213 of the light guide plate 210. In addition, a master can be fabricated using interference of laser beams, and a molding or an injecting molding can be performed using the master to form the light guide plate, on which the diffraction pattern or the scattering pattern is formed. The light exit unit 214 can be formed on the front surface 212 of the light guide plate 210. In this case, the front surface 212 can be the light exit surface. Light transmitted into the light guide plate 210 through the side surface 211 is emitted through the front surface 212 due to the presence of the light exit unit 214.

An image display panel 310 is located to face the surface, from which the light is emitted, of the light guide plate 210, that is, the front surface 212. The image display panel 310, for example, can be a transmissive liquid crystal panel. The transmissive liquid crystal panel converts the light emitted from the surface light illumination device 200 according to image information while transmitting the light. Detailed descriptions for the transmissive liquid crystal panel are omitted.

The narrower the incident angle distribution of the light that is incident into the light exit unit 214 is, the narrower the exit angle distribution of the light emitted from the front surface 212 of the light guide plate 210 is, and thus, a surface light having a constant brightness distribution can be obtained. The light emitted from the line light source device 100 is collimated light that has constant light intensity throughout the light exit portion 121 and a narrow optical angle distribution. Therefore, according to the surface light illumination device 200 including the line light source device 100 of the present invention, the surface light having the constant brightness distribution can be supplied to the image display panel 310, and the display apparatus including the surface light illumination device 200 can display images having a uniform brightness.

Figure 14:
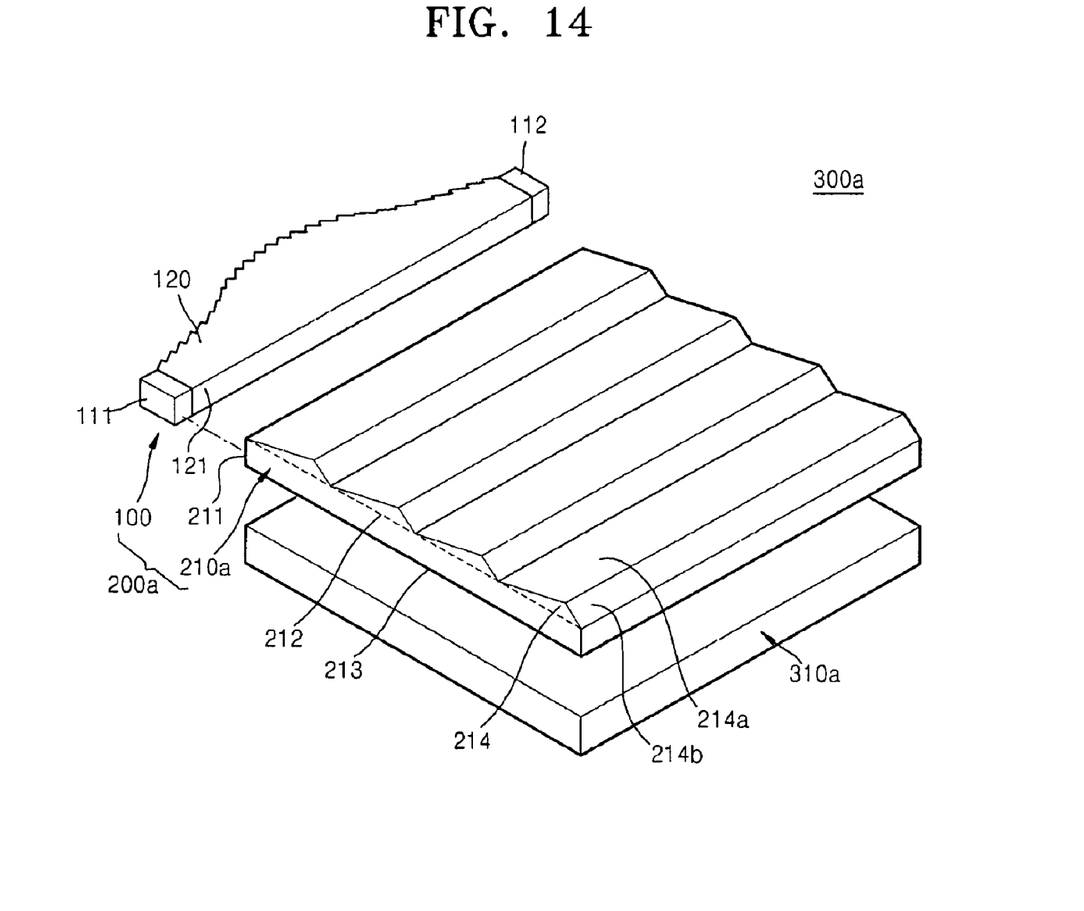
FIG. 14 is a perspective view of a surface light illumination device including the line light source device and a display apparatus according to another embodiment of the present invention.
Figure 15:
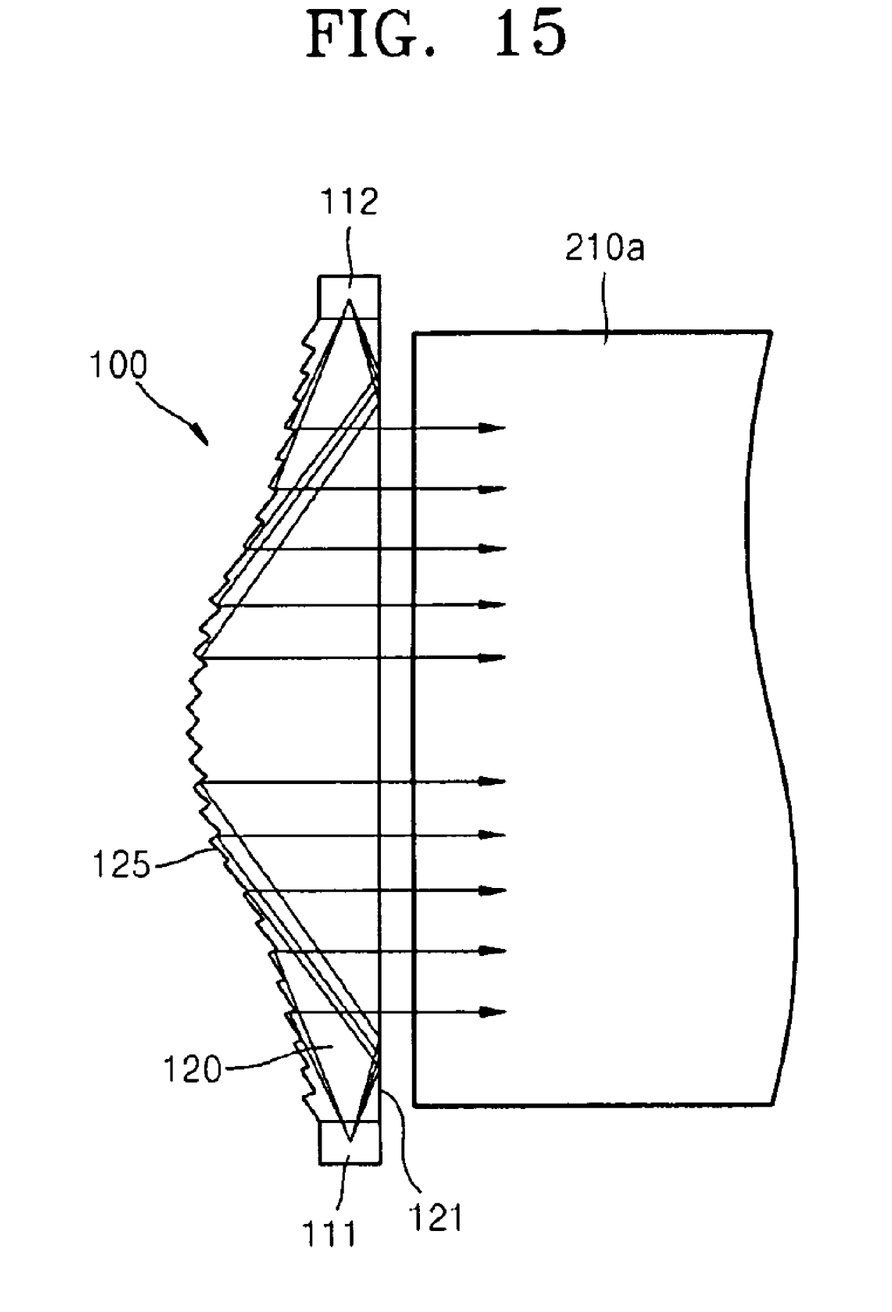
FIG. 15 is a plan view of the surface light illumination device and the display apparatus of FIG. 14.

The surface light illumination device 200 shown in FIGS. 12 and 13 that is located behind the image display panel 310 is a backlight unit (BLU). Additionally, a front light unit (FLU) can also be realized as a distinctive concept. FIG. 14 is a perspective view of a surface light illumination device including the line light source device 100 and a display apparatus according to another embodiment of the present invention. FIG. 15 is a plan view of the surface light illumination device and the display apparatus of FIG. 14, and FIG. 16 is a side view of the surface light illumination device and the display apparatus of FIG. 14.

Figure 16:
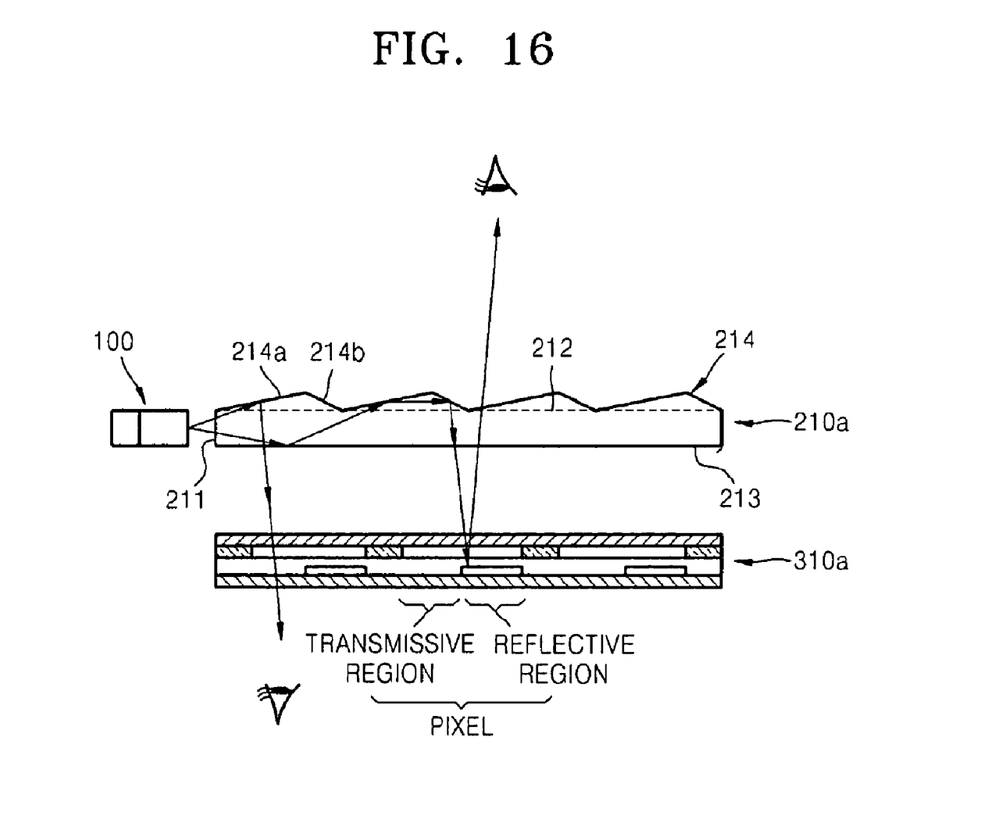
FIG. 16 is a side view of the surface light illumination device and the display apparatus of FIG. 14.

Referring to FIGS. 14, 15, and 16, the surface light illumination device 200a includes the line light source device 100 and a light guide plate 210a. The light guide plate 210a is a flat plate member formed of a light transmissive material such as PMMA or PC. The light guide plate 210a includes a side surface 211, on which light emitted from the line light source device 100 is incident, and a front surface 212 and a rear surface 213 connected to the side surface 211. The front surface 212 and the rear surface 213 face each other. The light exit portion 121 of the line light source device 100 is located to face the side surface 211 of the light guide plate 210a.

An image display panel 310a faces the surface of the light guide plate 210a, through which the light is emitted, that is, the rear surface 213. In particular, the image display panel 310a of the current embodiment is a semi-transmissive liquid crystal panel. The semi-transmissive liquid crystal panel includes transmissive regions transmitting the light and reflective regions reflecting the light as shown in FIG. 16. A transmissive region and a reflective region form a pixel. Due to the semi-transmissive liquid crystal panel, the display apparatus of the current embodiment can display images on both surfaces thereof. Some of the light emitted from the light guide plate 210a to the image display panel 310a is transmitted through the transmissive regions to form images on the transmissive side, and some of the light emitted from the light guide plate 210 to the image display panel 310a is reflected by the reflective regions to form images on the reflective side. That is, the image formed by the reflected light is displayed on the front surface 212 of the light guide plate 210a, and the image formed by the light transmitting the image display panel 310a is displayed on the opposite side as shown in FIG. 16.

The surface light illumination device 200a adopted in the above structure is located in front of the image display panel 310a, that is, an FLU is embodied. In a case where the surface light illumination device 200a is an FLU, the light reflected by the image display panel 310a transmits the light guide plate 210a to display image, and thus, it is difficult to arrange optical elements for making the brightness of the light constant on the light guide plate 210a. In addition, it is difficult to arrange a collimating optical element for reducing an angle of distribution of the light. That is, the BLU shown in FIGS. 12 and 13 can further include the optical elements such as a diffusion plate or a prism sheet for making the brightness constant on the front surface 212 of the light guide plate 210. However, the FLU shown in FIGS. 14 through 16 cannot further include the optical elements such as the diffusion plate or the prism sheet, since the light reflected by the image display panel 310a should transmit the light guide plate 210a again to display the image. In addition, the structure of the light exit unit 214 formed on the front surface 212 of the light guide plate 210 is restricted when it is compared to that of the BLU. For example, the light exit unit 214 can be a bias pattern having two inclined surfaces 214a and 214b. In this case, the inclined surface 214b having a large inclination angle is formed on a region that is much narrower than a region where the inclined surface 214a having a small inclination angle is formed. In addition, the inclined surface 214a has a very small inclination angle in order not to distort a path of the light that transmits the light guide plate 210a after being reflected by the image display panel 310a.

The light provided by the line light source device 100 of the present invention has uniform brightness throughout the entire light exit portion 121, and is collimated to have the narrow optical angle distribution. There is no need to add the optical elements such as the diffusion plate or the collimating element to the light guide plate, and thus, the line light source device 100 of the present invention can be effectively applied to the FLU 200a and the semi-transmissive display apparatus 300a including the FLU 200a.

As described above, in the optical guide bar, the line light source device, the surface light illumination device, and the display apparatus including the above of the present invention, the linear light having the uniform brightness and the uniform exit light distribution can be obtained, and the widths of the line light source device and the surface light illumination device can be nearly the same as each other, and thus, the size of the display apparatus can be minimized. In addition, the line light source device and the surface light illumination device can be effectively applied to the FLU of the display apparatus including the semi-transmissive image display panel, and then, reflective and transmissive images of high image quality can be realized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical guide bar comprising:
   a light exit portion for outputting light;
   light incident portions, on which light is incident, formed on both ends of the light exit portion; and
   a reflective portion facing the light exit portion and including a prism pattern that reflects light transmitted through the light incident portions towards the light exit portion,
   wherein the reflective portion has a shape, which is determined in consideration of an effective light emission width of the light incident portion, so that an intensity of the light irradiated from the light incident portions and incident on the reflective portion is substantially equal at all portions of the reflective portion, wherein, when it is assumed that a direction of an optical axis of the exit light is a y direction, a direction perpendicular to the optical axis is an x direction, a distance from the center portion of the reflective portion to a light incident portion in the x direction is L, and a distance from the center portion of the reflective portion to an end portion of the light exit portion in the y direction is $h_0$, the shape of the reflective portion can be represented as $$y = f(x) = (x^2 - L^2)\left[-\left(\frac{h_0}{L^2}\right) + \sum_{n=1}(a_n x^{2n})\right],$$

where n denotes an integer and $a_n$ is a coefficient of a polynomial expression.

2. The optical guide bar of claim 1, wherein a distance between the light exit portion and the reflective portion is large at a center portion of the reflective portion and becomes smaller towards the light incident portions.

3. The optical guide bar of claim 1, wherein when an apex angle of the prism pattern is divided into a first angle and a second angle by a line that is in parallel with an optical axis of the outputting light, the first and second angles are determined so that the light irradiated from centers of effective light emission widths of the light incident portions can be reflected to be parallel with the optical axis.

4. The optical guide bar of claim 1, wherein the prism pattern has an apex angle that is asymmetric based on a line that is in parallel with an optical axis of the outputting light.

5. A line light source device comprising:
the optical guide bar of claim 1; and
a light source irradiating light to light incident portions of the optical guide bar.

6. The line light source device of claim 5, wherein a distance between the light exit portion and the reflective portion is large at a center portion of the reflective portion and becomes smaller towards the light incident portions.

7. The line light source device of claim 5, wherein when an apex angle of the prism pattern is divided into a first angle and a second angle by a line that is in parallel with an optical axis of the outputting light, the first and second angles are determined so that the light irradiated from centers of effective light emission widths of the light incident portions can be reflected to be parallel with the optical axis.

8. The line light source device of claim 5, wherein the prism pattern has an apex angle that is asymmetric based on a line that is in parallel with an optical axis of the outputting light.

9. The line light source device of claim 5, wherein the light source is a point light source.

10. A surface light illumination device comprising:
the optical guide bar of claim 1;
a light source irradiating light to the light incident portions of the optical guide bar; and
a light guide plate including a side surface facing the light exit portion, on which light emitted from the optical guide bar is incident, a front surface and a rear surface facing each other and connected to the side surface, and a light exit unit disposed on one of the front surface and the rear surface such that light that is transmitted by the side surface is emitted from the one of the front surface and the rear surface.

11. The surface light illumination device of claim 10, wherein a distance between the light exit portion and the reflective portion is large at a center portion of the reflective portion and becomes smaller towards the light incident portions.

12. The surface light illumination device of claim 10, wherein when an apex angle of the prism pattern is divided into a first angle and a second angle by a line that is in parallel with an optical axis of the outputting light, the first and second angles are determined so that the light irradiated from centers of effective light emission widths of the light incident portions can be output in parallel with the optical axis.

13. The surface light illumination device of claim 10, wherein the prism pattern has an apex angle that is asymmetric based on a line that is in parallel with an optical axis of the outputting light.

14. The surface light illumination device of claim 10, wherein the light source is a point light source.

15. A display apparatus comprising:
the optical guide bar of claim 1;
a light source irradiating light to light incident portions of the optical guide bar;
a light guide plate including a side surface, on which light emitted from the optical guide bar is incident, a front surface and a rear surface facing each other and connected to the side surface, and a light exit unit disposed on one of the front surface and the rear surface such that light that is transmitted by the side surface is emitted from the one of the front surface and the rear surface; and
an image display panel located to face the one of the front surface and the rear surface that emits light to form images using the light emitted from the light guide plate.

16. The display apparatus of claim 15, wherein a distance between the light exit portion and the reflective portion is large at a center portion of the reflective portion and becomes smaller towards the light incident portions.

17. The display apparatus of claim 15, wherein when an apex angle of the prism pattern is divided into a first angle and a second angle by a line that is in parallel with an optical axis of the outputting light, the first and second angles are determined so that the lights irradiated from centers of effective light emission widths of the light incident portions can be output in parallel with the optical axis.

18. The display apparatus of claim 15, wherein the prism pattern has an apex angle that is asymmetric based on a line that is in parallel with an optical axis of the outputting light.

19. The display apparatus of claim 15, wherein the light source is a point light source.

20. The display apparatus of claim 19, wherein the image display panel is a semi-transmissive image display panel that reflects some of the light toward the light guide plate.

21. The optical guide bar of claim 1, wherein an effective light emission width of the light incident portion with respect to an arbitrary portion of the reflective portion is defined by a distance between a point where an extension of the light incident portion intersects an extension of a light ray reaching the arbitrary portion by being totally reflected on the light exit portion after being irradiated from the light incident portion and another point on the light incident portion which is farthest from the point and from which a light ray radiated is incident on the arbitrary portion without any reflection.

* * * * *